(12) United States Patent
Yoshida et al.

(10) Patent No.: US 9,385,469 B2
(45) Date of Patent: Jul. 5, 2016

(54) PROTECTOR AND WIRE HARNESS

(71) Applicant: Yazaki Corporation, Tokyo (JP)

(72) Inventors: Hiroyuki Yoshida, Kosai (JP); Eiichi Tohyama, Kosai (JP); Tatsuya Oga, Kosai (JP); Shinichi Inao, Kosai (JP); Masaaki Suguro, Kosai (JP)

(73) Assignee: YAZAKI CORPORATION, Tokyo (JP)

( * ) Notice: Subject to any disclaimer, the term of this patent is extended or adjusted under 35 U.S.C. 154(b) by 87 days.

(21) Appl. No.: 14/337,786

(22) Filed: Jul. 22, 2014

(65) Prior Publication Data

US 2014/0332266 A1 Nov. 13, 2014

Related U.S. Application Data

(63) Continuation of application No. PCT/JP2013/052643, filed on Jan. 30, 2013.

(30) Foreign Application Priority Data

Feb. 1, 2012 (JP) .................................. 2012-019510

(51) Int. Cl.
 *H01R 13/52* (2006.01)
 *B60R 16/02* (2006.01)
 *H01B 7/00* (2006.01)

(52) U.S. Cl.
 CPC ........ *H01R 13/5213* (2013.01); *B60R 16/0207* (2013.01); *B60R 16/0215* (2013.01); *H01B 7/0045* (2013.01)

(58) Field of Classification Search
 CPC ............. H01R 13/5213; H01B 7/0045; B60R 16/0207
 USPC .......................... 174/72 A, 72 R, 72 C, 71, 73
 See application file for complete search history.

(56) References Cited

U.S. PATENT DOCUMENTS 2,338,316 A * 1/1944 Buzzell ................ H02G 3/0675
  174/83
3,643,290 A * 2/1972 Milne ..................... F16L 41/08
  16/2.1

(Continued)

FOREIGN PATENT DOCUMENTS

CN 1625006 A 6/2005
CN 101960686 A 1/2011

(Continued)

OTHER PUBLICATIONS

Search Report dated May 2, 2013, issued by the International Searching Authority in counterpart International Application No. PCT/JP2013/052643.

(Continued)

*Primary Examiner* — Michael F McAllister
(74) *Attorney, Agent, or Firm* — Sughrue Mion, PLLC (57) ABSTRACT

A protector comprises a terminal engagement section to be engaged with a terminal of a tubular body into which one or a plurality of electrically conductive paths are to be inserted, wherein an electrically conductive path pullout hole is formed in the terminal engagement section as an area by which the one or the plurality of electrically conductive paths are pulled out; and the terminal engagement section further includes an electrically conductive path fixing portion that extends from an opening edge of the electrically conductive path pullout hole in a direction in which the one or the plurality of electrically conductive paths are pulled out, and a tubular body fixing portion that extends along an exterior surface of the tubular body.

5 Claims, 6 Drawing Sheets

(56) References Cited

U.S. PATENT DOCUMENTS

| | | | |
|---|---|---|---|
| 3,890,458 A * | 6/1975 | Mooney | H02G 3/06 16/2.1 |
| 4,535,196 A * | 8/1985 | Milne | H02G 3/0683 16/2.1 |
| 6,668,865 B2 * | 12/2003 | Miyamoto | B60R 16/0215 138/108 |
| 7,060,908 B2 | 6/2006 | Daito | |
| 7,094,970 B2 | 8/2006 | Kihira | |
| 7,109,421 B2 * | 9/2006 | Sekino | B60R 16/0215 174/71 R |
| 8,563,866 B2 | 10/2013 | Oga et al. | |
| 8,592,685 B2 | 11/2013 | Kamenoue | |
| 2004/0099427 A1 | 5/2004 | Kihira | |
| 2005/0118852 A1 | 6/2005 | Daito | |
| 2008/0210828 A1 | 9/2008 | Kogure et al. | |
| 2011/0056730 A1 | 3/2011 | Kamenoue | |
| 2011/0132638 A1 | 6/2011 | Oga et al. | |

FOREIGN PATENT DOCUMENTS

| | | |
|---|---|---|
| EP | 2317619 A1 | 5/2011 |
| JP | 10-080036 A | 3/1998 |
| JP | 3071989 U | 9/2000 |
| JP | 2001-204120 A | 7/2001 |
| JP | 2004-171952 A | 6/2004 |
| JP | 2006-094619 A | 4/2006 |
| JP | 2008-308068 A | 12/2008 |
| JP | 2008-308070 A | 12/2008 |
| JP | 2010-011538 A | 1/2010 |
| JP | 2010-143028 A | 7/2010 |
| JP | 2011-229203 A | 11/2011 |
| JP | 2012-143028 A | 7/2012 |

OTHER PUBLICATIONS

Written Opinion dated May 2, 2013, issued by the International Searching Authority in counterpart International Application No. PCT/JP2013/052643.

Office Action issued Nov. 17, 2015, issued by the Japanese Patent Office in counterpart Japanese Patent Application No. 2012-019510.

Communication dated Nov. 4, 2015, from the State Intellectual Property Office of People's Republic of China in counterpart Application No. 201380007582.X.

* cited by examiner

PROTECTOR AND WIRE HARNESS

CROSS REFERENCE TO RELATED APPLICATIONS

This application is a continuation of PCT application No. PCT/JP2013/052643, which was filed on Jan. 30, 2013 based on Japanese Patent Application (No. 2012-019510) filed on Feb. 1, 2012, the contents of which are incorporated herein by reference.

BACKGROUND OF THE INVENTION

1. Field of the Invention

The present invention relates to a protector and a wire harness including the protector.

2. Description of the Related Art

A high voltage wire harness is used in order to electrically interconnect equipment in a hybrid automobile and an electric vehicle; specifically, a motor unit, an inverter unit, and a battery.

The wire harness disclosed in JP-A-2004-171952 has three electric wires for electrically interconnecting equipment and a metal pipe that accommodates and shields the great majority of the entire length of the three electric wires.

SUMMARY OF THE INVENTION

When a configuration of the wire harness includes a metal pipe as with the related art, the metal pipe is used after being cut into a required length. Accordingly, an edge (including burrs or the like) might occur along a brim of an end opening of the metal pipe. Upon contact with sheaths of the electric wires, the edge may inflict damage to them.

Incidentally, it is preferable to pull out the electric wires (electrically conductive paths), which make up the wire harness, out of a terminal of the metal pipe up to a predetermined length. The reason for this is that, if the electric wires are short, a problem will arise in electrical connections. In contrast, if the electric wires are long, additional work for cutting the electric wires to a predetermined length will be required. In the meantime, maintaining the length of pullouts of the electric wires is important for subsequent processes and a dimensional guarantee.

The present invention has been conceived in light of the circumstance, and a challenge to be met by the present invention is to provide a protector and a wire harness that can protect a pull out of an electrically conductive path can also guarantee a dimension by making a length of the pullout of the electrically conductive path stable.

A protector of the present invention that is conceived to meet the challenge and defined in a first aspect of the present invention comprises: a terminal engagement section to be engaged with a terminal of a tubular body into which one or a plurality of electrically conductive paths are to be inserted, wherein an electrically conductive path pullout hole is formed in the terminal engagement section as an area by way of which the one or the plurality of electrically conductive paths are pulled out; and wherein the terminal engagement section further includes an electrically conductive path fixing portion that extends from an opening edge of the electrically conductive path pullout hole in a direction in which the one or the plurality of electrically conductive paths are pulled out and a tubular body fixing portion that extends along an exterior surface of the tubular body.

Under the present invention having such a characteristic, even if an edge is present in the terminal of the tubular body, the electrically conductive path will not be affected by the edge. The reason for this is that the protector has the terminal engagement section to be engaged with the terminal of the tubular body. Moreover, under the present invention, a length of a pullout of the electrically conductive path is maintained. The reason for this is that the terminal engagement section additionally has the electrically conductive path fixing portion for fixing the electrically conductive path and the tubular body fixing portion for fixing the tubular body.

In the protector of the present invention defined in a second aspect of the present invention according to the first aspect, a terminal insert groove that surrounds an entire circumference of the terminal of the tubular body is formed in the terminal engagement section.

Under the present invention having such a characteristic, even if an edge is present in the terminal of the tubular body, the electrically conductive path will not be affected by the edge. The reason for this is that the terminal insert groove is formed in the terminal engagement section to be engaged with the terminal of the tubular body, thereby surrounding the entire circumference of the terminal.

In the protector of the present invention defined in a third aspect of the present invention is based on the protector defined in the second aspect of the present invention, a confirmation opening that permits viewing of the terminal of the tubular body from outside is formed in the terminal engagement section.

Under the present invention having such a characteristic, engagement of the tubular body with the terminal can be prevented from becoming incomplete. The reason for this is that the position of the terminal of the tubular body is ascertained by way of the confirmation opening.

In the protector of the present invention defined in a fourth aspect accruing to the first, second, or third aspect, a fiducial surface that is substantially parallel to an end face of the terminal of the tubular body and that serves as a criterion on occasions of work on the tubular body is formed in the terminal engagement section.

Under the present invention having such a characteristic, when work on the tubular body is required, positional displacement, which would otherwise occur during work, can be prevented even when the protector remains engaged with the terminal of the tubular body. The reason for this is that the fiducial surface that serves as a criterion during work is available.

In the protector of the present invention defined in the fifth aspect of the present invention according to the first, second, third, or fourth aspect, the electrically conductive path fixing portion and the tubular body fixing portion are formed into a tongue shape.

Under the present invention having such a characteristic, the electrically conductive path fixing portion and the tubular body fixing portion are formed into a shape that facilitates fixing of the electrically conductive path and fixing of the tubular body and a shape that allows adoption of an inexpensive fixing method. The reason for them is that the electrically conductive path fixing portion and the tubular body fixing portion are formed into a tongue shape that is effective when a fixing method, such as a tape and a binding band, is adopted.

A wire harness of the present invention that is defined in a sixth aspect of the present invention and conceived to meet the challenge is characterized by including one or a plurality of electrically conductive paths and a tubular body into which the one or the plurality of electrically conductive paths are to be inserted, wherein the protector defined in the first, second, third, fourth, or fifth aspect is engaged with one terminal of the tubular body, and the one or the plurality of electrically conducive paths and the tubular body are fixed by use of the protector.

Under the present invention having such a characteristic, there is provided a wire harness in which the electrically conductive path is not susceptible to damage even when pulled out of the terminal of the tubular body and in which dimensional guarantee is achieved in connection with the length of the pullout of the electrically conductive path. The reason for them is that the protector defined in first, second, third, fourth, or fifth aspect is included in the configuration of the wire harness.

In the wire harness of the present invention defined in a seventh aspect of the present invention according to the sixth aspect, the protector is also engaged with another terminal of the tubular body, and the one or the plurality of electrically conductive paths and the tubular body are also fixed at the other terminal by means of the protector after the tubular body is subjected to bending work.

Under the present invention having such a characteristic, there is provided a wire harness in which one terminal and the other terminal of the tubular body are engaged with the respective protectors.

The present invention defined in the first aspect is directed to the protector that includes the terminal engagement section to be engaged with the terminal of the tubular body, the electrically conductive path fixing portion for fixing the electrically conductive path, and the tubular body fixing portion for fixing the tubular body. Therefore, the present invention yields an advantage of the ability to protect the pullout of the electrically conductive path and an advantage of the ability to provide dimensional guarantee by making the length of the pullout of the electrically conductive path stable. Moreover, the present invention also yields an advantage of the ability to prevent infliction of damage to the electrically conductive path, which would otherwise occur during work for inserting the electrically conductive path into the tubular body and during manufacturing/processing work in subsequent processes. So long as infliction of damage can be prevented, re-creation of a product can naturally be obviated, and another advantage of the ability to enhance quality and reliability is additionally yielded.

According to the present invention defined in the second aspect, the terminal insert groove that surrounds the entire circumference of the terminal of the tubular body is formed in the terminal engagement section. Therefore, the present invention yields an advantage of the ability to protect the pullout of the electrically conductive path more reliably. Moreover, according to the present invention, the protector comes to assume a structure in which the terminal insert groove is inserted into the terminal of the tubular body. Therefore, there is also yielded an advantage of the ability to make a state of the protector engaged with the terminal stable by means of the insert structure.

According to the present invention defined in third aspect, wherein the confirmation opening by way of which the terminal of the tubular body is viewed is provided, which enables performance of an easy determination as to whether or not the terminal insert groove is inserted into the terminal and remains engaged. Accordingly, the present invention yields an advantage of the ability to enhance workability. So long as a determination as to whether or not the terminal insert groove is in an engaged state can be readily made, there will be yielded an advantage of the ability to prevent occurrence of problems, such as disengagement of the protector, occurrence of spacing between the protector and the tubular body, and insufficient dimensions, and enhance quality and reliability.

The present invention also yields an advantage of the ability to make a position of the tubular body at the terminal stable and contribute to dimensional guarantee.

According to the present invention defined in the fourth aspect, the fiducial surface is formed in the terminal engagement section. Hence, the present invention yields an advantage of the ability to prevent occurrence of positional displacements, which would otherwise be caused by work, by use of the fiducial surface at the occasion of work on the tubular body. Specifically, since the fiducial surface serves as a criterion for a bend position employed by a bender and a criterion for a fixing position, the present invention yields an advantage of the ability to prevent occurrence of positional displacements, which would otherwise be caused by work even when the protector is engaged with the terminal of the tubular body. In addition, there is yielded an advantage of the ability to facilitate positioning during work operation.

According to the present invention defined in the fifth aspect, the electrically conductive path fixing portion and the tubular body fixing portion are formed in a tongue shape. Accordingly, the present invention yields an advantage of the ability to fix the electrically conductive path and the tubular body by use of a tape, a binding band, or the like, and the ability to enhance workability by facilitating fixing of the electrically conductive path and fixing of the tubular body. Moreover, since fixing can be practiced by use of the tape, the binding band, or the like, there is also yielded an advantage of the ability to adopt an inexpensive fixing method.

According to the present invention defined in the sixth aspect, the configuration of the wire harness includes the protector defined in the first, second, third, fourth or fifth. Consequently, the present invention yields an advantage of the ability to provide a wire harness that yields the advantages that have been described thus far. The present invention also yields an advantage of the ability to provide a much better wire harness.

The present invention defined in the seventh aspect is directed toward the wire harness in which the protectors are engaged with the one terminal and the other terminal of the tubular body, respectively. Even in this case, there is yielded an advantage of the ability to provide a much better wire harness.

DETAILED DESCRIPTION OF THE EXEMPLARY EMBODIMENTS

Each of protectors has a terminal engagement section to be engaged with a terminal of a tubular body, an electrically conductive path fixing portion for fixing the electrically conductive path, and a tubular body fixing portion for fixing the tubular body. The wire harness also includes an electrically conducive path, a tubular body into which the electrically conductive path is to be inserted, and the protector to be engaged with at least one terminal of the tubular body.

First Embodiment

Figure 1:
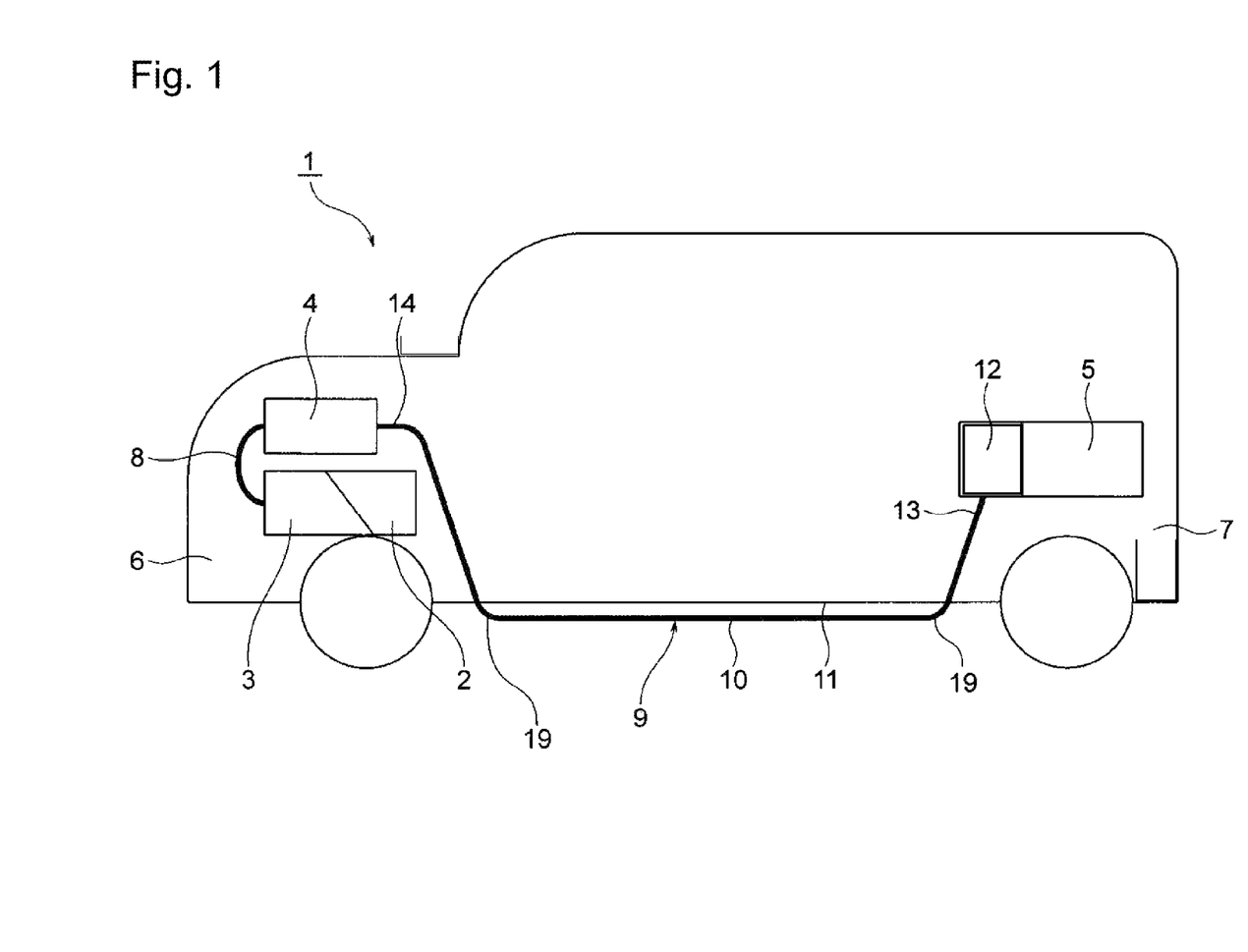
FIG. 1 is a diagrammatic view showing a routed state of a wire harness including a protector of the present invention.
Figure 2:
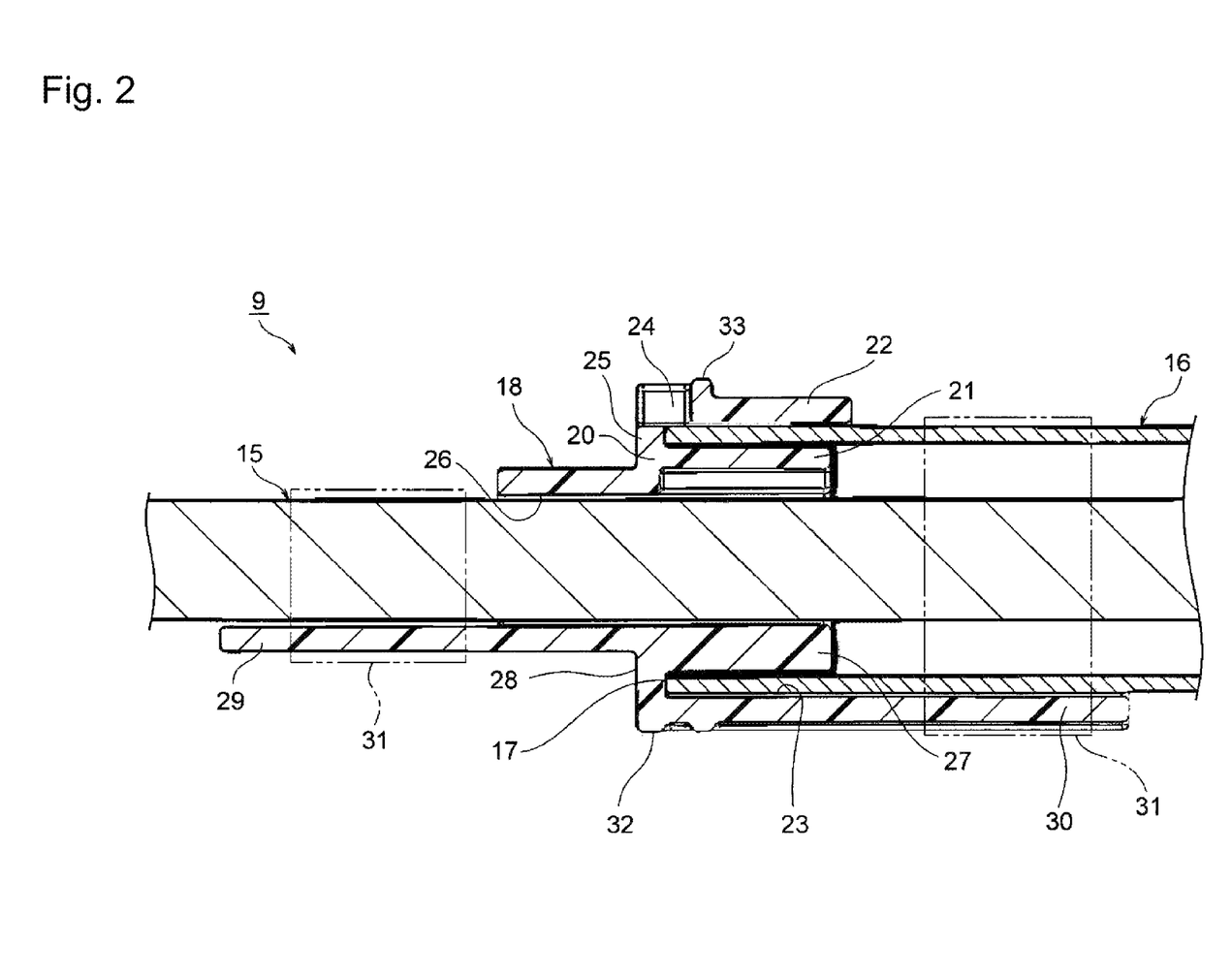
FIG. 2 is a cross sectional view of the protector, a tubular body, and an electrically conductive path.
Figure 3:
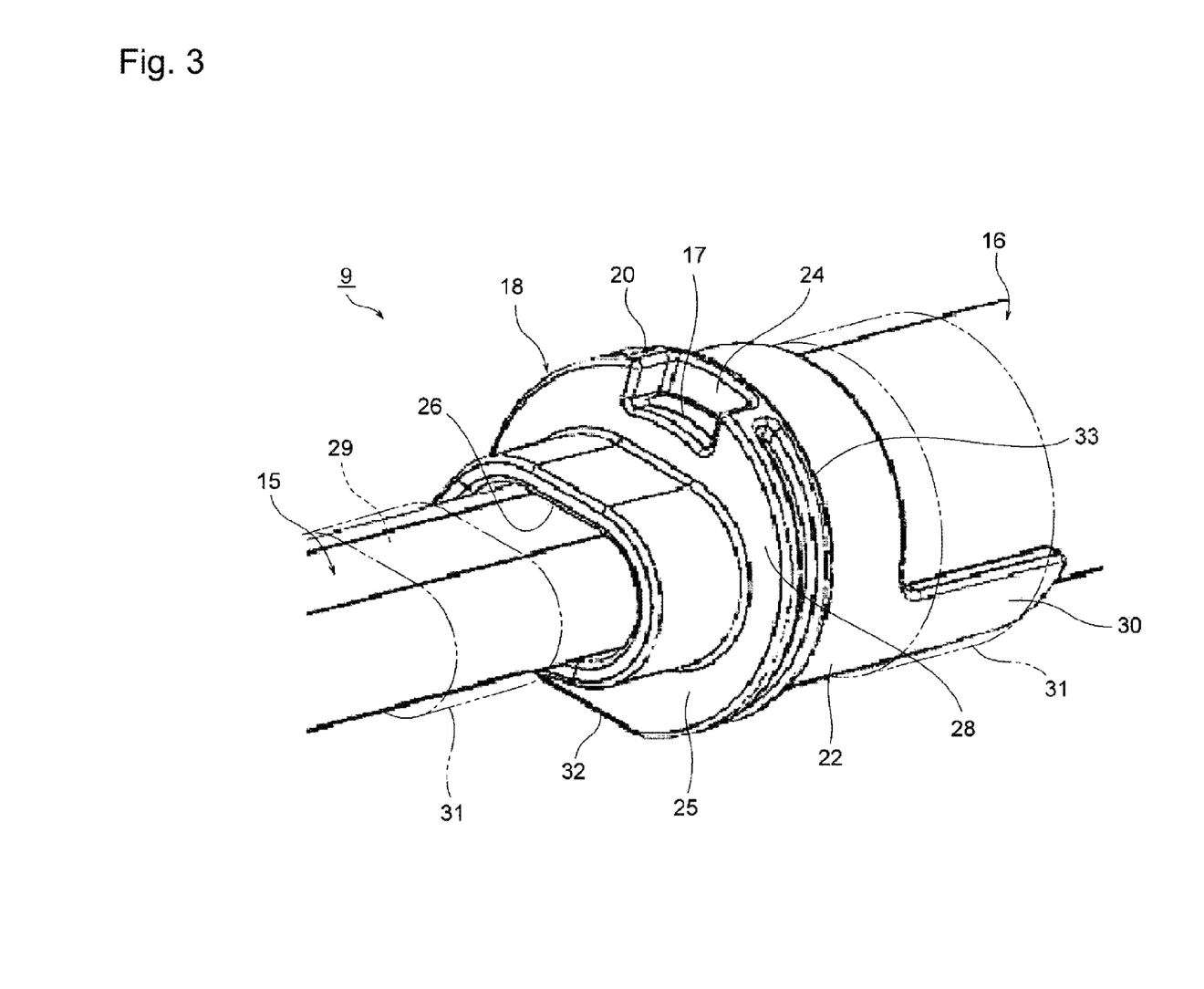
FIG. 3 is a perspective view of the protector, the tubular body, and the electrically conductive path.
Figure 4:
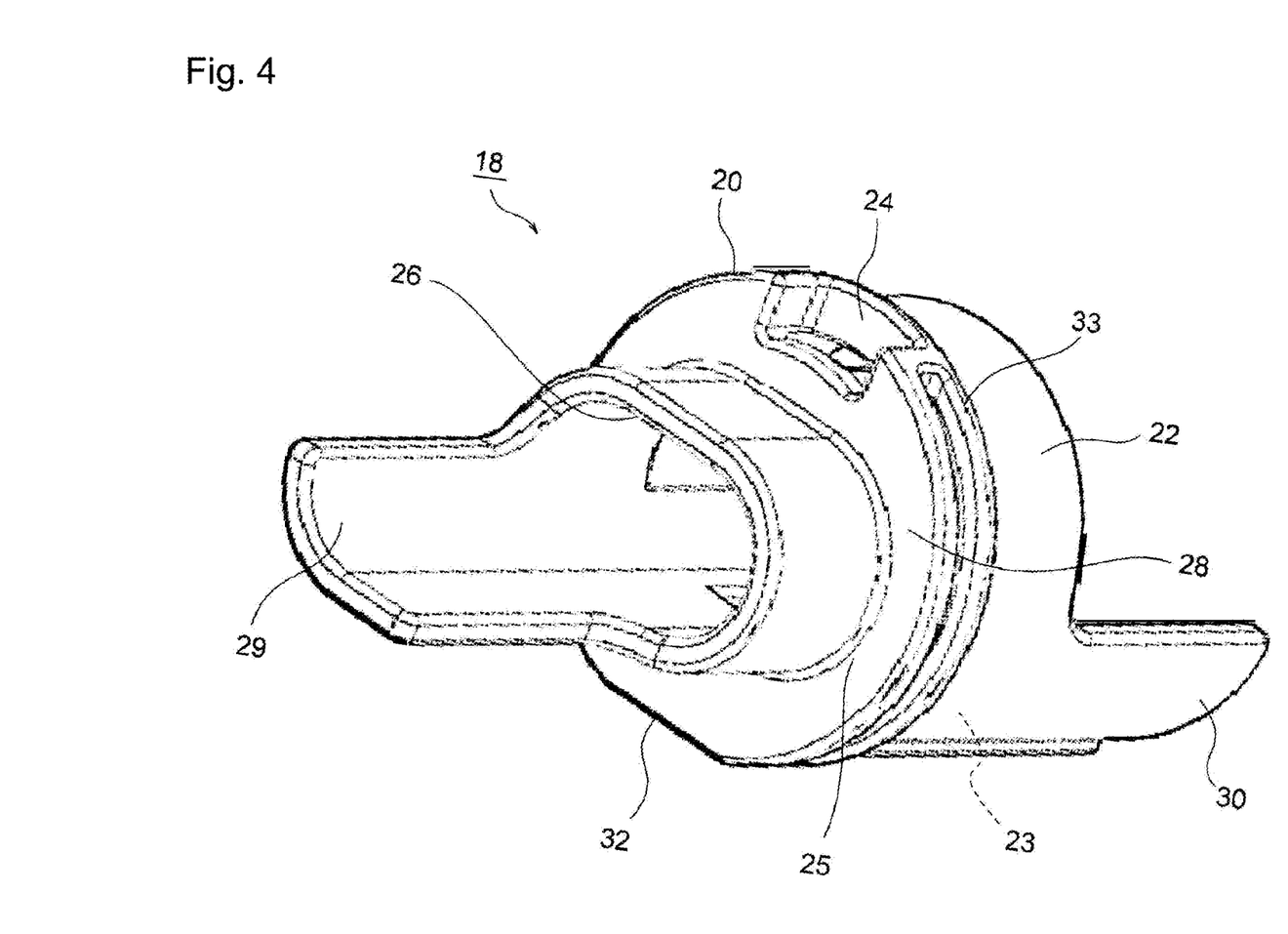
FIG. 4 is a perspective view of the protector.
Figure 5:
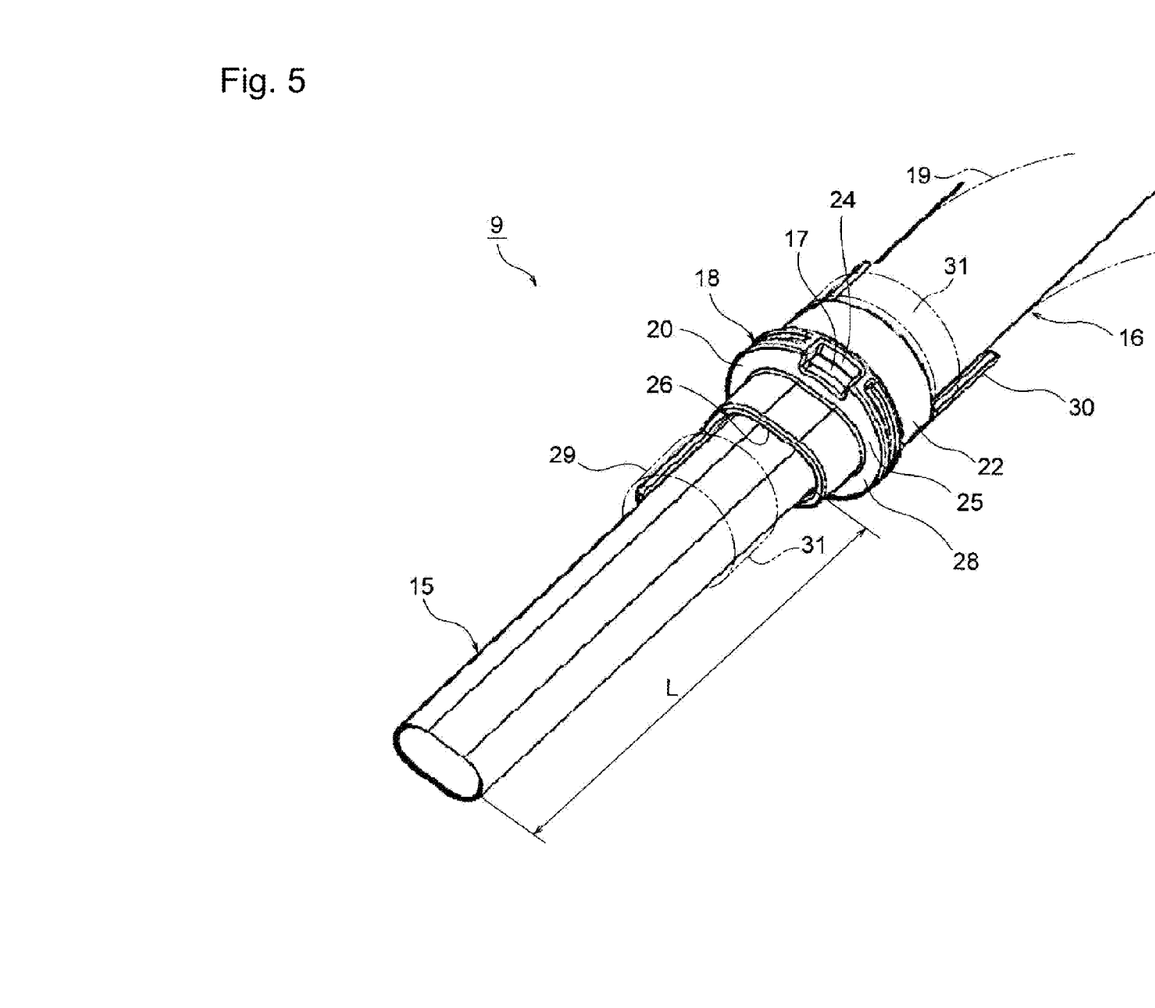
FIG. 5 is a perspective view of the protector, the tubular body, and the electrically conductive path showing a state in which dimensions are guaranteed.

A first embodiment is hereunder described by reference to the drawings. FIG. 1 is a diagrammatic view showing a routed state of a wire harness including a protector of the present invention. Further, FIG. 2 is a cross sectional view of the protector, a tubular body, and an electrically conductive path. FIG. 3 is a perspective view of the protector, the tubular body, and the electrically conductive path. FIG. 4 is a perspective view of the protector. FIG. 5 is a perspective view of the protector, the tubular body, and the electrically conductive path showing a state in which dimensions are guaranteed.

In the embodiment, the present invention shall be adopted for a wire harness to be routed through a hybrid automobile (which can also be an electric vehicle or a common automobile).

In FIG. 1, reference numeral 1 designates a hybrid automobile. The hybrid automobile 1 is a vehicle that is driven by means of a mixture of two types of power, one from an engine 2 and the other from a motor unit 3. Electric power is fed to the motor unit 3 from a battery 5 (a battery pack) by way of an inverter unit 4. The engine 2, the motor unit 3, and the inverter unit 4 are mounted in an engine room 6 where front wheels, or the like, are situated, in the embodiment. The battery 5 is mounted in an automobile rear block 7 where rear wheels, or the like, are situated (the battery can also be mounted in an automobile compartment located behind the engine room 6).

The motor unit 3 and the inverter unit 4 are connected to each other by means of a high voltage wire harness 8. The battery 5 and the inverter unit 4 are also connected together by means of a high voltage wire harness 9. An intermediate portion 10 of the wire harness 9 is routed on a ground side of a vehicle body under-floor portion 11. The wire harness 9 is also routed substantially in parallel with the vehicle body under-floor portion 11. The vehicle body under-floor portion 11 is a known body and also serves as a so-called panel member. A through hole (whose reference numeral is omitted) is formed in predetermined positions. The wire harness 9 is inserted into the through holes.

The wire harness 9 and the battery 5 are connected to each other by way of a junction block 12 provided in the battery 5. A rear end 13 of the wire harness 9 is electrically connected to the junction block 12 by means of a known method. A front end 14 of the wire harness 9 is electrically connected to the inverter unit 4 by means of a known method.

The motor unit 3 is presumed to be configured by inclusion of a motor and a generator. Further, the inverter unit 4 is presumed to be configured by inclusion of an inverter and a converter. The motor unit 3 is presumed to be formed as a motor assembly including a shielding case. The inverter unit 4 is also presumed to be formed as an inverter assembly including a shielding case. The battery 5 is an Ni—MH-based or Li-ion-based battery and presumed to be module-configured. Incidentally, for instance, a rechargeable battery; for instance, a capacitor, can also be used. The battery 5 is not limited to any specific type, so long as it can be used for the hybrid automobile 1 or the electric vehicle.

First, a configuration and structure of the wire harness 9 are described.

In FIGS. 2 and 3, the wire harness 9 is made up of an electrically conductive path 15, a tubular body 16 into which the electrically conductive path 15 is inserted; a protector 18 to be engaged with at least one terminal 17 of the tubular body 16; and an un-illustrated equipment connection section. In the wire harness 9 of the embodiment, although not illustrated especially, another protector 18 is to be engaged with a remaining terminal of the tubular body 16.

A high voltage cabtyre cable assuming an oval cross sectional profile is employed as the electrically conductive path 15 in the embodiment. The electrically conductive path 15 includes two conductors; insulators that cover the respective two conductors; and a sheath that collectively sheathes the high voltage electric wires. The electrically conductive path 15 is formed so as to assume a length required to establish electrical connections.

The high voltage electric wire that is made up of the conductor and the insulator can also be deemed to be an electrical conductive path. A high voltage electrically conductive path made by providing a known bus bar with an insulator, a high voltage coaxial composite electrically conductive path made by coaxially bundling n-channel circuits ("n" circuits) into a single path, including known high voltage electric wires (the high voltage coaxial composite electrically conductive path will be described in a second embodiment), can also be mentioned as the electrically conductive path 15. A conductor structure of the high voltage electric wire can also be either a conductor structure made by twisting strands or a rod-shaped conductor structure (a conductor structure made of; for instance, a round single core) having; for instance, a round cross sectional profile. The conductor is fabricated from copper, a copper alloy, aluminum, or an aluminum alloy.

Each of terminals of the electrically conductive path 15 is equipped with terminal hardware. The terminal hardware makes up the un-illustrated equipment connection section. Such terminal hardware is connected to an electrical connection section by a known method after being inserted into an interior of a shield case, such as the inverter unit 4. The electrically conductive path 15 must be pulled out of each of the terminals (one terminal 17 and the un-illustrated other terminal) of the tubular body 16 to a predetermined length for electrical connection.

The tubular body 16 is an exterior member for the wire harness 9. A metal pipe (e.g., an aluminum pipe) is adopted in the embodiment. The tubular body 16 is formed so as to assume a length and an inner diameter that are required to accommodate the electrically conductive path 15. The tubular body 16 is also formed in thickness required to exhibit a protective function.

The tubular body 16 is not restricted to the metal pipe but can also be a tubular body made of a resin. The tubular body 16 is formed so as to assume a circular cross sectional profile in the embodiment (the cross sectional profile shall be a mere example and can also be an ellipsoidal shape, an oval shape, or a rectangular shape).

Such a tubular body 16 is subjected to bending in conformance with a routing path of the wire harness 9. Reference numeral 19 (see FIG. 1 and FIG. 5) designates a bend. For instance, an un-illustrated bender is used for bending work.

The tubular body 16 does not encounter any problems even when the terminals (the one terminal 17 and the un-illustrated other terminal) are left as they are after being cut from a long-length tubular body. An edge (including burrs, or the like) formed along an opening edge of the terminal is covered as a result of the protector 18 being engaged with the terminal 17. Each of end faces of the tubular body 16 is formed as a surface that is orthogonal to an axis of the tubular body 16. The protectors 18 are formed so as to butt against such end faces, respectively. The protectors 18 that are engaged with the respective terminals 17 of the tubular body 16 are described hereinbelow in detail.

In FIGS. 2 through 4, the protector 18 is a member that engages with the one terminal 17 (a terminal) of the tubular body 16 as mentioned above and has a terminal engagement section 20 as the engagement section. The terminal engagement section 20 is formed into a cap shape that covers the one terminal 17. Specifically, the terminal engagement section 20 has an interior insert 21, an exterior insert 22, a terminal insert groove 23, a confirmation opening 24, a terminal opening cover 25, and an electrically conductive path pullout hole 26 and is formed into a cap shape.

The interior insert 21 is formed as an area that is to be inserted and placed on an interior side of the tubular body 16 when engaged with the one terminal 17. The interior insert 21 is annularly formed. A portion of the interior insert 21 is formed as a support 27 (see FIG. 2) for the electrically conductive path 15. The support 27 is formed and placed on a lower side of the interior insert 21 in the drawing.

The exterior insert 22 is formed as an area to be inserted and placed on an exterior side of the tubular body 16 when engaged with the one terminal 17. The exterior insert 22 is annularly formed.

Spacing between the interior insert 21 and the exterior insert 22 is formed as the terminal insert groove 23. The terminal insert groove 23 is formed into a shape that encloses an entire circumference of the one terminal 17. A bottom of the terminal insert groove 23 is formed into a shape against which an end face of the one terminal 17 butts when the protector 18 is completely engaged with the tubular body 16. The bottom of the groove is placed at a position of an interior surface of the terminal opening cover 25.

The confirmation opening 24 is positioned and formed at a location in an upper side of the interior insert 22 continuous to the terminal opening cover 25. The confirmation opening 24 is formed into a shape that establishes continuity with the terminal insert groove 23 and that enables observation of the one terminal 17 of the tubular body 16 from the outside. As a result of formation of the confirmation opening 24, the protector 18 enables the user to easily confirm whether or not the one terminal 17 butts against the bottom groove of the terminal insert groove. Accordingly, incomplete engagement of the protector 18 with the one terminal 17 is inhibited, and workability associated with engagement becomes improved.

If it is possible to easily determine if a state of normal engagement is achieved, problems, such as disengagement of the protector 18, spacing between the protector 18 and the one terminal 17, and a short measurement, can be prevented, and quality and reliability enhancement can be achieved. If the protectors 18 are in a normal state of engagement, the location of the tubular body 16 at the one terminal 17 becomes stable, which might also contribute to measurement assurance to be described later.

The terminal opening cover 25 is formed as a wall oriented in a direction orthogonal to the axis of the tubular body 16. The terminal opening cover 25 is also formed as an area that covers the opening of each of the terminals of the tubular body 16. An exterior surface of each of the terminal opening covers 25 of the embodiment is formed as a fiducial surface 28. The fiducial surface 28 is a surface that is to serve as a criterion at the occasion of work for bending the tubular body 16 (the fiducial surface 28 serves as a criterion for a bend position of the bender, or the like, or a criterion for a fix position). The electrical conductive path pullout hole 26 is formed at a center of each of the terminal opening covers 25 that each have such a fiducial surface 28.

Each of the electrically conductive path pullout holes 26 is formed in conformance with the cross sectional profile of the electrically conductive path 15. In the embodiment, the electrically conductive path pullout holes 26 are formed so as to assume openings with an oval shape. Moreover, in the embodiment, the electrically conducive path pullout holes 26 is formed into a tubular shape that projects along the axis of the tubular body 16. Incidentally, as a result of the electrically conductive path pullout hole 26 being formed into a tubular shape, an area of the each of the electrically conductive path pullout hole 26 for supporting the electrically conductive path 15 can be increased.

As a result of the protector 18 being engaged with the one terminal 17 of the tubular body 16, the electrically conductive path 15 comes to be pulled out of the electrically conductive path pullout hole 26.

An electrically conductive path fixing portion 29 and a tubular body fixing portion 30 are additionally formed in the terminal engagement section 20 that substantially assumes a cap shape. The electrically conductive path fixing portion 29 is an area where the electrically conductive path 15 is to be fixed. The electrically conductive path fixing portion 29 is formed into a tongue shape that extends from a lower portion of a leading end of a projection of the electrically conductive path pullout hole 26 along a direction in which the electrically conductive path 15 is pulled out. In the meantime, the tubular body fixing portion 30 is an area where the tubular body 16 is to be fixed. The tubular body fixing portion 30 is formed into a tongue shape that extends from a lower portion of an opening edge of a projection of the exterior insert 22 along an exterior surface of the tubular body 16.

The electrically conductive path fixing portion 29 and the tubular body fixing portion 30 are presumed to be formed into an appropriate shape according to a fixing method. In the embodiment, they are formed into a shape that permits adoption of an inexpensive fixing method, such as a tape 31 and a binding band. An acetate tape, a polyester tape, and others, can be mentioned as an example of the tape 31.

Reference numeral 32 in the terminal engagement section 20 designates a roll prevention portion. The roll prevention portion 32 is formed into a planar shape. The roll prevention portion 32 is formed and located in a lower portion of the terminal engagement section 20 (a layout and the number of roll prevention portions 32 are mere exemplification).

In the embodiment, the roll prevention portion 32 assuming a planar shape is formed in the terminal engagement section 20. Accordingly, a flange 33 having a slight outward bulge is also formed at a position on the outer circumference of the terminal engagement section 20 to be engaged with the tubular body 16 that assumes a circular cross sectional profile.

Engagement of the protector 18, or the like, is now described on the basis of the configuration and the structure that have been described above.

In FIG. 2, FIG. 3, and FIG. 5, the protector 18 is engaged with the one terminal 17 of the tubular body 16. The edge of the opening of the one terminal 17 is covered by means of engagement. Specifically, even when the edge includes burrs, or the like, the burrs will not affect the electrically conductive path 15. The protector 18 and the tubular body 16 are fixed by means of winding the tape 31 around a position of the tubular body fixing portion 30 of the protector 18.

After the protector 18 has been engaged with the one terminal 17, the electrically conductive path 15 is inserted into the tubular body 16 from the other un-illustrated terminal. Insertion of the electrically conductive path 15 is carried out by way of the electrically conductive path pullout hole 26 of the protector 18 until a predetermined length L of the electrically conductive path 15 is pulled out. The protector 18 and the electrically conductive path 15 are fixed by means of winding the tape 31 around a position of the electrically conductive path fixing portion 29 of the protector 18.

Since the protector 18 is fixed to the tubular body 16 as mentioned above, both the electrically conductive path 15 and the tubular body 16 are fixed, too.

In FIG. 5, as is seen from the fixed state, the dimension of the electrically conductive path 15 pulled in the predetermined length L by way of the electrically conductive path pullout hole 26 is guaranteed.

The tubular body 16 is subjected to bending with the bender by utilization of the fiducial surface 28 of the protector 18, whereby the bend 19 is formed in the tubular body 16. The dimension of the electrically conductive path 15 pulled in the predetermined length L is naturally guaranteed during bending work of the bend 19.

After bending work is performed with the bender, the electrically conductive path 15 and the tubular body 16 are fixed at the other un-illustrated terminal of the tubular body 16. Specifically, the tubular body 16 and the electrically conductive path 15 are fixed by way of the protector 18 engaged with the other terminal.

As has been described by reference to FIG. 1 to FIG. 5, the protector 18 includes the terminal engagement section 20 to be engaged with the terminal (the one terminal 17 and the other terminal) of the tubular body 16, the electrically conductive path fixing portion 29 for fixing the electrically conductive path 15, and the tubular body fixing portion 30 for fixing the tubular body 16. Therefore, there are yielded an advantage of the ability to protect the pullout of the electrically conductive path 15 and another advantage of the ability to make the length of the pullout of the electrically conductive path 15 stable, thereby providing dimensional guarantee.

There is also yielded an advantage of the ability to prevent infliction of damage to the electrically conductive path 15, which would otherwise arise during work for inserting the electrically conductive path 15 into the tubular body 16 and during manufacturing/processing work in subsequent processes. So long as infliction of damage can be prevented, re-creation of a product can naturally be obviated, and another advantage of the ability to enhance quality and reliability is additionally yielded.

Second Embodiment

Figure 6A:
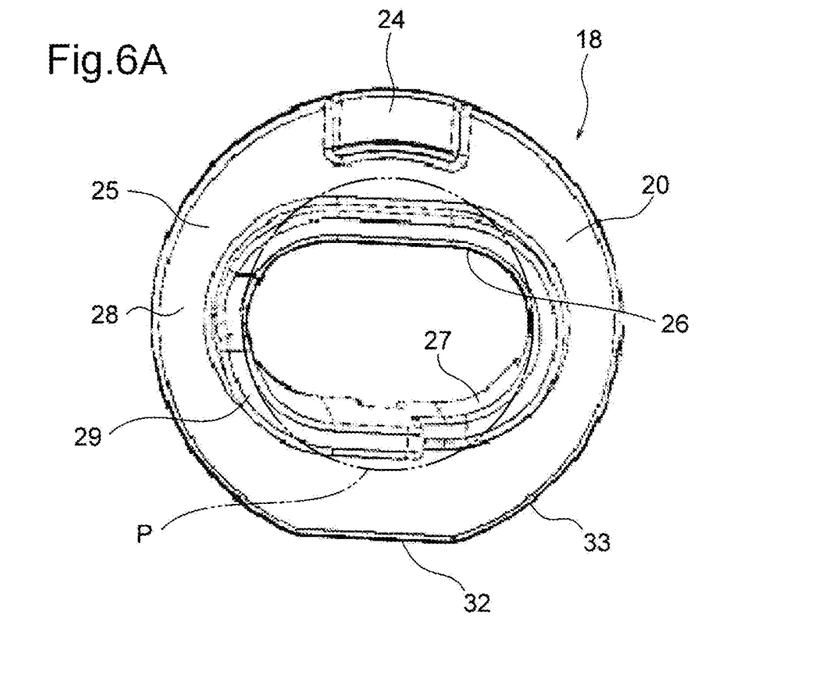
FIGS. 6A and 6B are drawings showing other examples of the protector and the electrically conductive path.
Figure 6B:
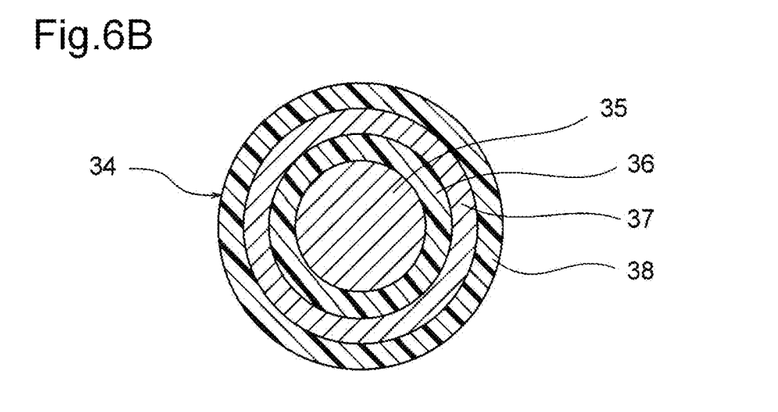

By reference to the drawings, a second embodiment is described hereunder. FIGS. 6A and 6B are drawings showing other examples of the protector and the electrically conductive path. The second embodiment naturally yields the same advantages as those described in connection with the first embodiment.

In FIG. 6A, the electrically conductive path pullout hole 26 of the protector 18 can also be formed into a tubular shape, such as that designated by a phantom line P. In this case, an electrically conductive path shown in FIG. 6B; i.e., a high voltage coaxial composite electrically conductive path 34, becomes applicable.

The high voltage coaxial composite electrically conductive path 34 is configured so as to include a plus circuit and a minus circuit in one path. In short, the high voltage coaxial composite electrically conductive path 34 is configured so as to include two lines of circuitry. Specifically, the high voltage coaxial composite electrically conductive path 34 includes a first electrically conductive path 35 that is situated at the center of the high voltage coaxial composite electrically conductive path 34 and that assumes a circular cross sectional profile; a first insulator 36 that sheathes an outer circumference of the first electrically conductive path 35 in a predetermined thickness; a second electrically conductive path 37 placed outside the first insulator 36; and a second insulator 38 that sheathes an outer circumference of the second electrically conductive path 37 in a predetermined thickness.

The high voltage coaxial composite electrically conductive path 34 is not limited to the two lines of circuitry. So long as lines of circuitry can be coaxially configured in one path, three lines of circuitry (i.e., three circuits), four lines of circuitry (i.e., four circuits), . . . , and "n" lines of circuitry (i.e., "n" circuits), can be adopted.

In addition, it is natural that the present invention can be implemented while being modified in various ways without departing the gist of the present invention.

According to the present invention, it is directed to the protector that includes the terminal engagement section to be engaged with the terminal of the tubular body, the electrically conductive path fixing portion for fixing the electrically conductive path, and the tubular body fixing portion for fixing the tubular body. Therefore, the present invention yields an advantage of the ability to protect the pullout of the electrically conductive path and an advantage of the ability to provide dimensional guarantee by making the length of the pullout of the electrically conductive path stable. Moreover, the present invention also yields an advantage of the ability to prevent infliction of damage to the electrically conductive path, which would otherwise occur during work for inserting the electrically conductive path into the tubular body and during manufacturing/processing work in subsequent processes. So long as infliction of damage can be prevented, re-creation of a product can naturally be obviated, and another advantage of the ability to enhance quality and reliability is additionally yielded.

What is claimed is:

1. A protector comprising:
   a terminal engagement section to be engaged with a terminal of a tubular body into which one or a plurality of electrically conductive paths are to be inserted; and
   wherein an electrically conductive path pullout hole is formed in the terminal engagement section as an area by which the one or the plurality of electrically conductive paths are pulled out; and
   the terminal engagement section further includes an electrically conductive path fixing portion that extends from an opening edge of the electrically conductive path pullout hole in a direction in which the one or the plurality of electrically conductive paths are pulled out, and a tubular body fixing portion that extends along an exterior surface of the tubular body,
   wherein a terminal insert groove that surrounds an entire circumference of the terminal of the tubular body is formed in the terminal engagement section, and
   wherein a confirmation opening that permits viewing of the terminal of the tubular body from outside is formed in the terminal engagement section.

2. The protector according to claim 1, wherein a fiducial surface that is parallel to an end face of the terminal of the tubular body and that serves as a criterion on occasions of work on the tubular body is formed in the terminal engagement section.

3. The protector according to claim 1, wherein the electrically conductive path fixing portion and the tubular body fixing portion are formed into a tongue shape.

4. A wire harness including one or a plurality of electrically conductive paths and a tubular body into which the one or the plurality of electrically conductive paths are to be inserted, wherein the protector defined in claim 1 is engaged with one terminal of the tubular body, and the one or the plurality of electrically conducive paths and the tubular body are fixed by the protector.

5. The wire harness according to claim 4, wherein the protector is a first protector, and wherein a second protector is engaged with another terminal of the tubular body, and the one or the plurality of electrically conductive paths and the tubular body are fixed at the other terminal by means of the second protector after the tubular body is subjected to bending work.

\* \* \* \* \*